March 19, 1968  J. BADER  3,373,711
HANDLING SYSTEM FOR SEAPLANE ENGINES
Filed Dec. 29, 1958  5 Sheets-Sheet 1
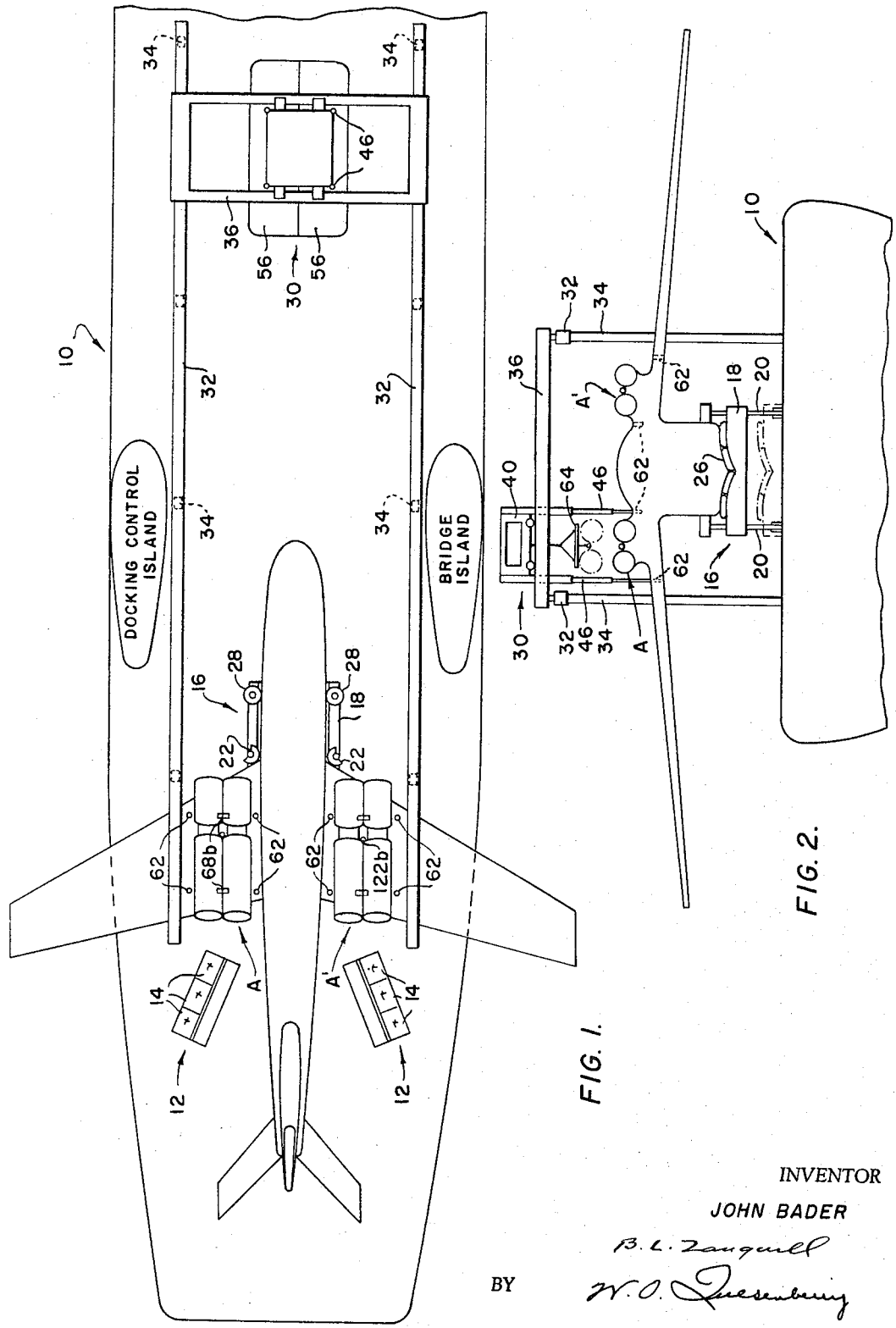
INVENTOR
JOHN BADER
BY *B. L. Zangwill*
*W. O. Quesenberry*
ATTORNEYS March 19, 1968  J. BADER  3,373,711
HANDLING SYSTEM FOR SEAPLANE ENGINES
Filed Dec. 29, 1958  5 Sheets-Sheet 2

INVENTOR
JOHN BADER
BY
ATTORNEYS

INVENTOR
JOHN BADER
BY B. L. Zandell
W. O. Quisenberry
ATTORNEYS.

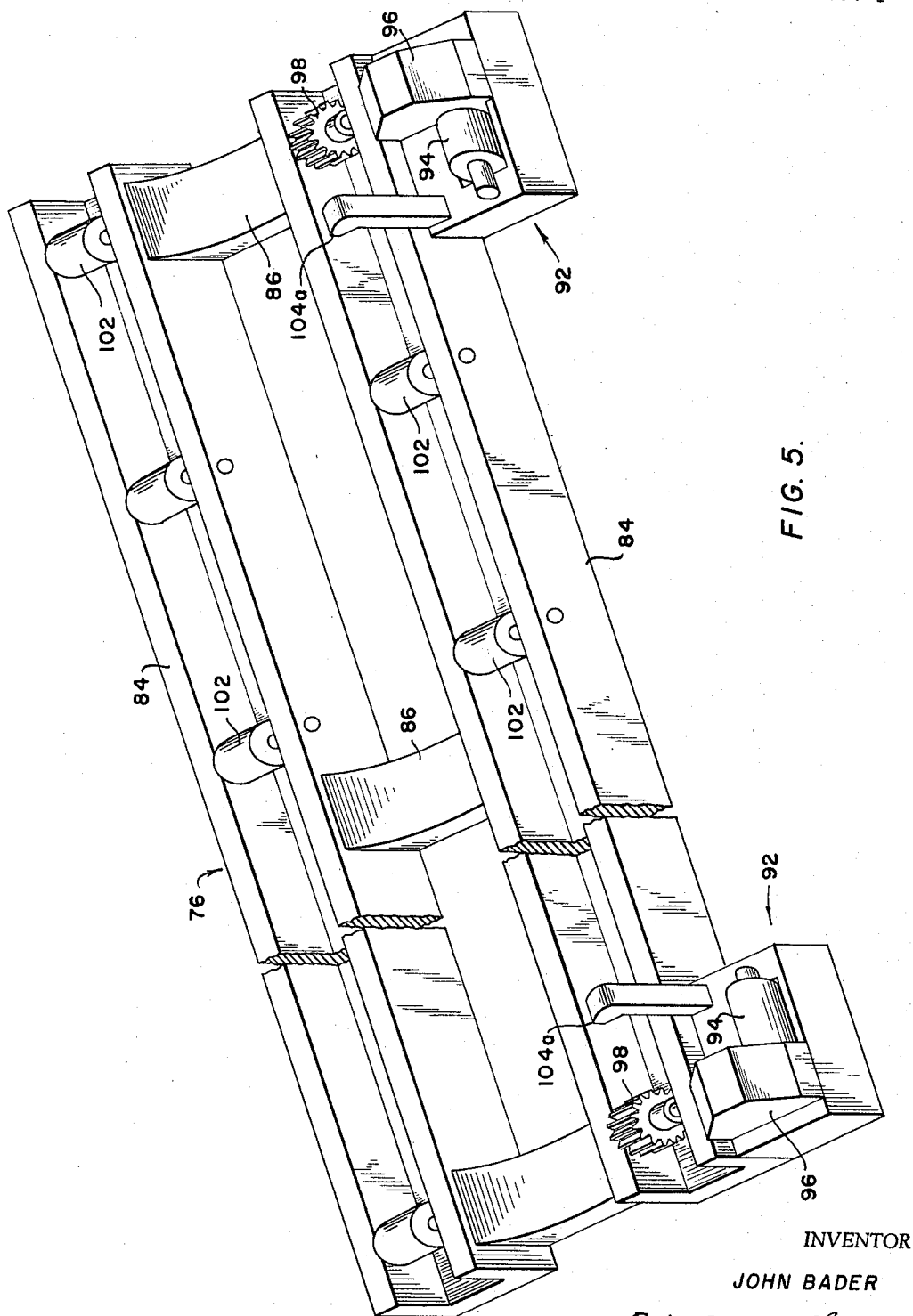

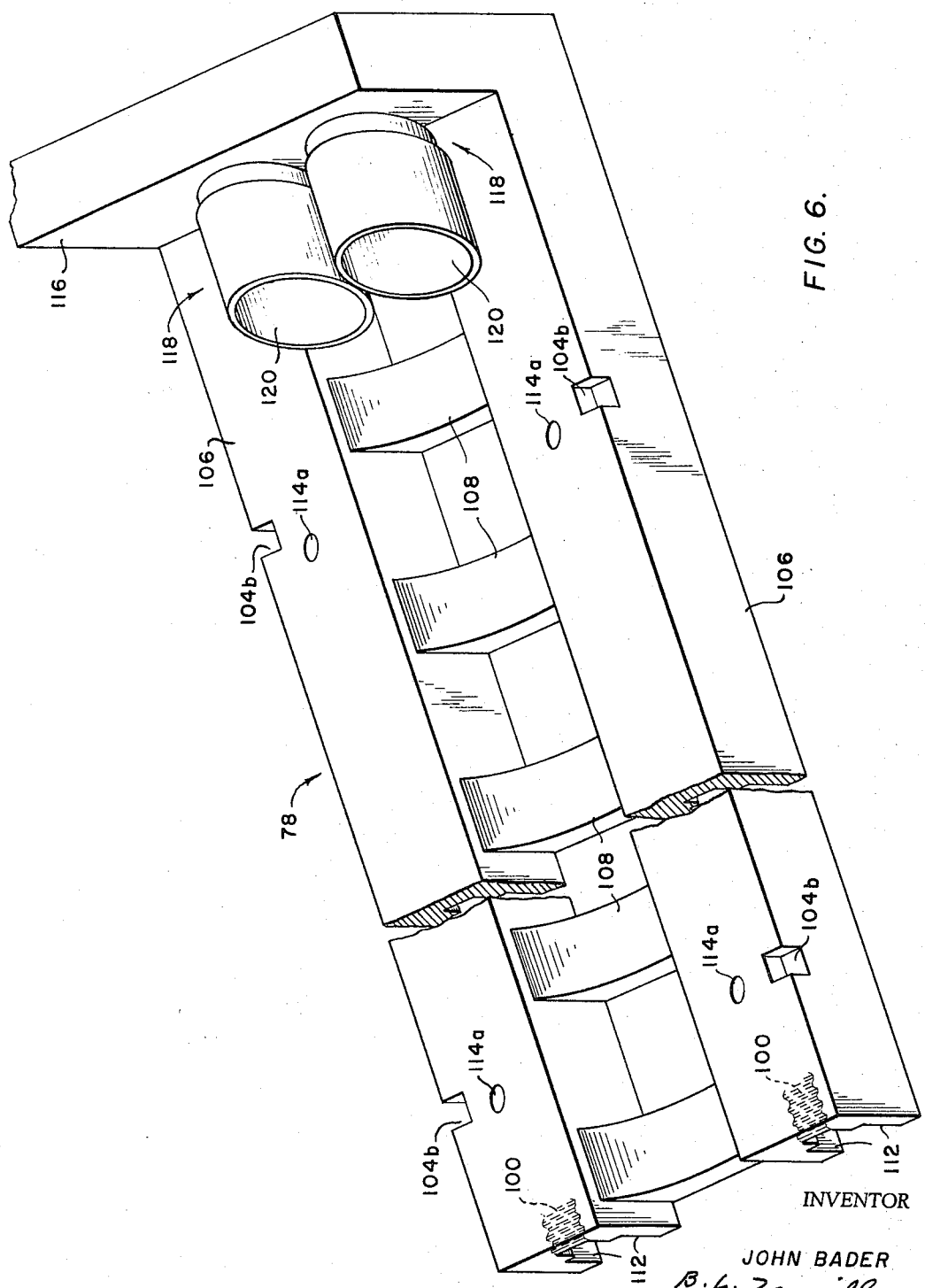

United States Patent Office 3,373,711
Patented Mar. 19, 1968

3,373,711
HANDLING SYSTEM FOR SEAPLANE ENGINES
John Bader, 2511 Woodley Road NW.,
Washington, D.C. 20008
Filed Dec. 29, 1958, Ser. No. 783,626
14 Claims. (Cl. 114—43.5)

The invention described herein may be manufactured and used by or for the Government of the United States of America for governmental purposes without the payment of any royalties thereon or therefor.

This invention relates to handling systems for aircraft engines and more particularly to systems for handling nuclear engines for seaplanes.

The proposed air cycle nuclear engine for seaplanes becomes radioactive in use. This very heavy engine has to be removed from the airplane for inspection, tests, repairs or the like without human contact until it "cools." Furthermore, such an engine requires continuous air cooling during this handling period.

A broad object of this invention is to provide a system for removing engines from aircraft.

A more specific object of the invention is to provide a system for removing nuclear engines from seaplanes.

A further object of the invention is to provide a handling system for nuclear engines for seaplanes whereby the engines are moved from place to place by remote control and without human contact.

In applicant's copending application Ser. No. 783,625 filed Dec. 29, 1958, there is disclosed and claimed a system particularly adapted for docking seaplanes powered by nuclear engines. Only so much of the docking system as is necessary for a complete understanding of the instant invention is disclosed herein. Therefore, for a complete description of the docking system, reference may be had to applicant's above copending application.

In accordance with the instant invention, after a seaplane has been docked and made secure on the deck of a tender or like ship, the nuclear engine is removed by a traveling bridge crane, adapted for travel longitudinally and transversely of the deck on elevated rails. The crane includes a guided engine hoist platform that is first centered over the engine and then lowered into contact with the engine and made fast thereto by a number of automatic clamps. After the engine is so secured to the platform, the plane pilot, shielded within the plane, releases the engine from the plane, after which the hoist lifts the engine from the plane. The traveling crane then carries the platform with the engine attached thereto along the elevated rails and is stopped immediately over a hatch in the ship's deck. The crane is made fast to the hatch and lowers the platform and attached engine into the ship's hold for storage or maintenance. The platform is equipped with an air nozzle for supplying cooling air to the engine during its movement from the plane to the hold of the tender ship.

In the ship's hold, immediately beneath the hatch, there is located an automatic elevator. A self propelled dolly is mounted on the elevator for horizontal movement relative thereto transversely of the hold, and on the dolly is mounted an engine-receiving cradle, which cradle is self propelled and movable relative to the dolly and longitudinally of the hold. In the hold, forward of the elevator, there are located a plurality of containers for receiving and storing nuclear engines, and a "hot shop," having an operating table therein, is located aft of the elevator for receiving the nuclear engine for inspection, maintenance, removal of the reactor, or the like.

The arrangement is such that an engine lowered into the hold by the crane is received and made fast to the cradle mounted on the dolly, which dolly is mounted on the elevator. The elevator is lowered to the level of either a storage container or a work bench within the hot shop, as desired. Then the dolly is moved to line the cradle with either a storage container or the work bench, and the cradle with the engine secured thereto is moved relative to the dolly either forward into a storage container or aft onto the work bench. The engine remains secured to the cradle at all times that it is in the hold. The cradle is equipped with a pair of remote controlled electric fans for supplying cooling air to the engine while it is on the cradle. The engine is removed from storage or from the work bench by reversing the above steps.

All of the above steps are remotely controlled, programed and interlocked by electronic mechanisms in a manner such that all movements are synchronized and an engine cannot be released from one mechanism before it is made fast to another mechanism. As examples: the engine cannot be released from the seaplane before it is secured to the hoist platform; it cannot be lowered into the hold unless the crane is properly centered and secured to the hatch and the cradle is positioned to receive it; it cannot be released from the platform until it is secured to the cradle; the dolly cannot move relative to the elevator unless the cradle is in horizontal alignment with a storage container or with the work bench; and the cradle cannot be moved relative to the dolly unless the cradle is lined up with a receptacle, such as, a storage container or with the work bench.

Other objects and many of the attendant advantages of this invention will be readily appreciated as the same becomes better understood by reference to the following detailed description when considered in connection with the accompanying drawings in which like reference numerals designate like parts throughout the several views thereof and wherein:

FIG. 1 is a top plan view of a tender with a seaplane docked thereon and showing the traveling crane positioned over the hatch in accordance with this invention;

FIG. 2 is a schematic aft elevational view of the tender showing the seaplane in the elevated docking cradle, with parts omitted, and also showing the crane positioned above one of the engines of the seaplane in accordance with this invention;

FIG. 5 is a perspective view of a dolly adapted to receive and transport the cradle of FIG. 6; and FIG. 6 is a perspective view of an engine-receiving cradle adapted to receive and transport a nuclear engine within the hold of the ship.

Figure 3:
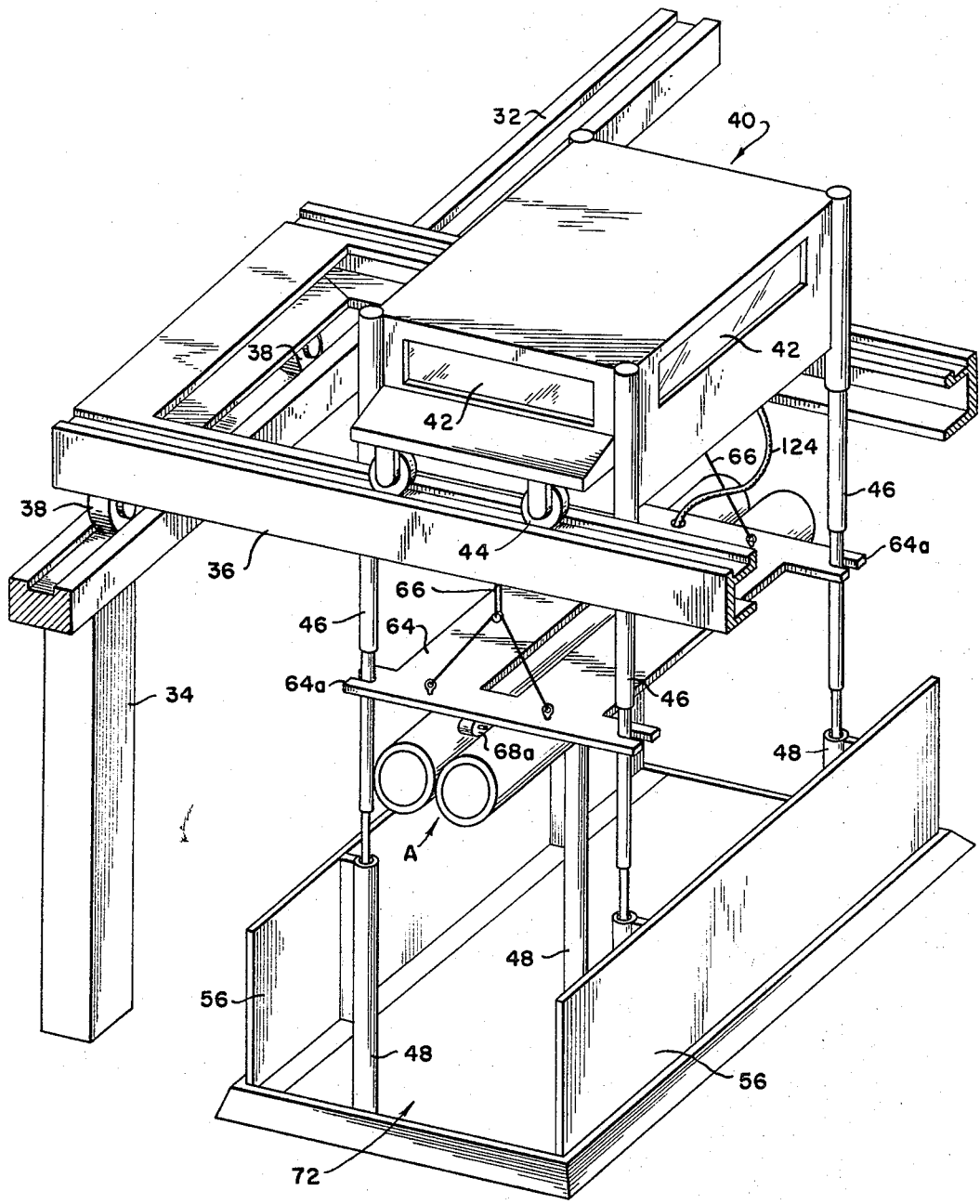
FIG. 3 is a perspective view of the traveling crane, with parts broken away for clarity of illustration, and showing the crane platform about to lower a nuclear engine through the open hatch into the hold.

Referring to the accompanying drawing, a submersible type tender 10, as shown in FIGS. 1 and 2, is equipped with a preferred embodiment of a system for docking a seaplane in accordance with the invention disclosed in applicant's copending application Ser. No. 783,625, referred to above. The docking system includes a pair of hinged guides 12 positioned near the stern on the top side or deck of the tender; the purpose of which is to guide the plane into position over a docking cradle, to be described hereinafter. The guides, which have been omitted in FIG. 2, are equipped with padding or cushions 14 which act as fenders to protect the plane from shock and/or scarring. The guides can be lowered into the deck of the tender flush with the deck when not in use. Hydraulic or any suitable power means (not shown) may be used for this purpose.

Positioned in front of the guides 12 or further forward on the deck of the tender is a docking cradle 16; the purpose of which is to elevate and hold the seaplane in a docked position. The docking cradle consists of a frame 18 suitable in length and width to hold and support a seaplane. The frame is built up of truss members and is light in construction so as to be more easily lifted by the momentum of the plane, as will be described hereinafter. The frame is supported on a suitable number of pantograph type legs 20 (FIG. 2), which are hinged to the frame at one end and to the deck at the other end. This is done in order that the frame can be lowered or folded down flat against the deck, as shown in broken lines in FIG. 2, and be free of the bottom of the plane as it floats into position over the cradle. Also attached to and made a part of the frame is a pair of padded post or like abutments 22. The posts are positioned forward of the center of the frame on opposite sides thereof. These posts or abutments are set in an upright position in order that the wings or other designated portions of the plane will contact the posts and the momentum of the plane will force the posts forward, thus carrying the frame 18 forward and upward, causing the frame to rise on the pantograph legs 20 from the broken line to the full line position shown in FIG. 2. Two opposite legs are equipped with extended portions which protrude below the deck of the tender and are suitably attached to hydraulic pistons not shown.

The hydraulic pistons act as auxiliary power means to raise the frame 18 into contact with the bottom of the plane when the plane comes in contact with the posts 22 in case the seaplane's forward energy is not sufficient to fully erect the cradle. If desired, the hydraulic pistons may be energized by contact of the plane with the posts. The hydraulic pistons are used also for lowering the cradle, as described hereinafter. The frame 18 is constructed with a series of cross supports which are concave in shape and thus provide a bed or cradle for the plane to rest in. This cradle is provided with cushions 26 (FIG. 2) for the purpose of protecting the bottom of the plane. Positioned along the sides of the frame 18 are a series of padded rollers 28. These rollers cushion and guide the plane into position as it floats in over the frame or cradle. The cushions 14 and 26 and the rollers 28 may be inflatable-deflatable air cushions.

During a docking procedure the tender is partially submerged to a level whereby the top of the retracted cradle, as shown in broken lines, FIG. 2, will be a slight distance below the bottom of the seaplane. Any suitable, conventional means, not shown, may be used for submerging and surfacing the tender. This submerging of the tender allows the plane to float thru and between the guides 12 and over the cradle 16. As the plane passes over the cradle 16 it contacts the posts 22, as before described, and the momentum of the plane pushing against the posts forces the frame 18 forward and up and into contact with the bottom of the plane with such force as to lift the plane to a position that he plane will no longer float freely and will not then be subject to toss or movement by the waves or a rough sea. As described before, the momentum of the plane will raise the frame 18, which in turn raises and docks the seaplane. In order to hold the frame in a raised position, a pawl and ratchet mechanism, not shown, is provided on one or more of the legs 20. The teeth on the ratchet are angled in the direction to allow the ratchet free movement when the frame 18 is moving forward and up but will become fastened to the pawl at the peak of movement and prevent the reverse movement, thus holding the legs 20 in an upright position and the frame 18 and plane in a raised position or docked position. The legs 20 are of a length at least equal to the height of the sea waves expected to be encountered during docking, or to the draft of the seaplane, according to which is larger.

In accordance with the instant invention, and as shown in FIGS. 1 and 2, the ship's deck is equipped with a traveling bridge crane 30, supported on a pair of elevated rails 32, which rails are supported by spaced posts 34. The rails may be either permanently elevated above the deck by the posts 34, or the posts may be of a telescopic type so that the rails and supported crane may be lowered relative to the deck when not in use. A rectangular bridge 36, made up of channel members (FIG. 3), is mounted for longitudinal movement on the rails by opposite pairs of rollers 38, one or more of which rollers is connected with an electric motor, not shown, for propelling the bridge on the rails.

Figure 4:
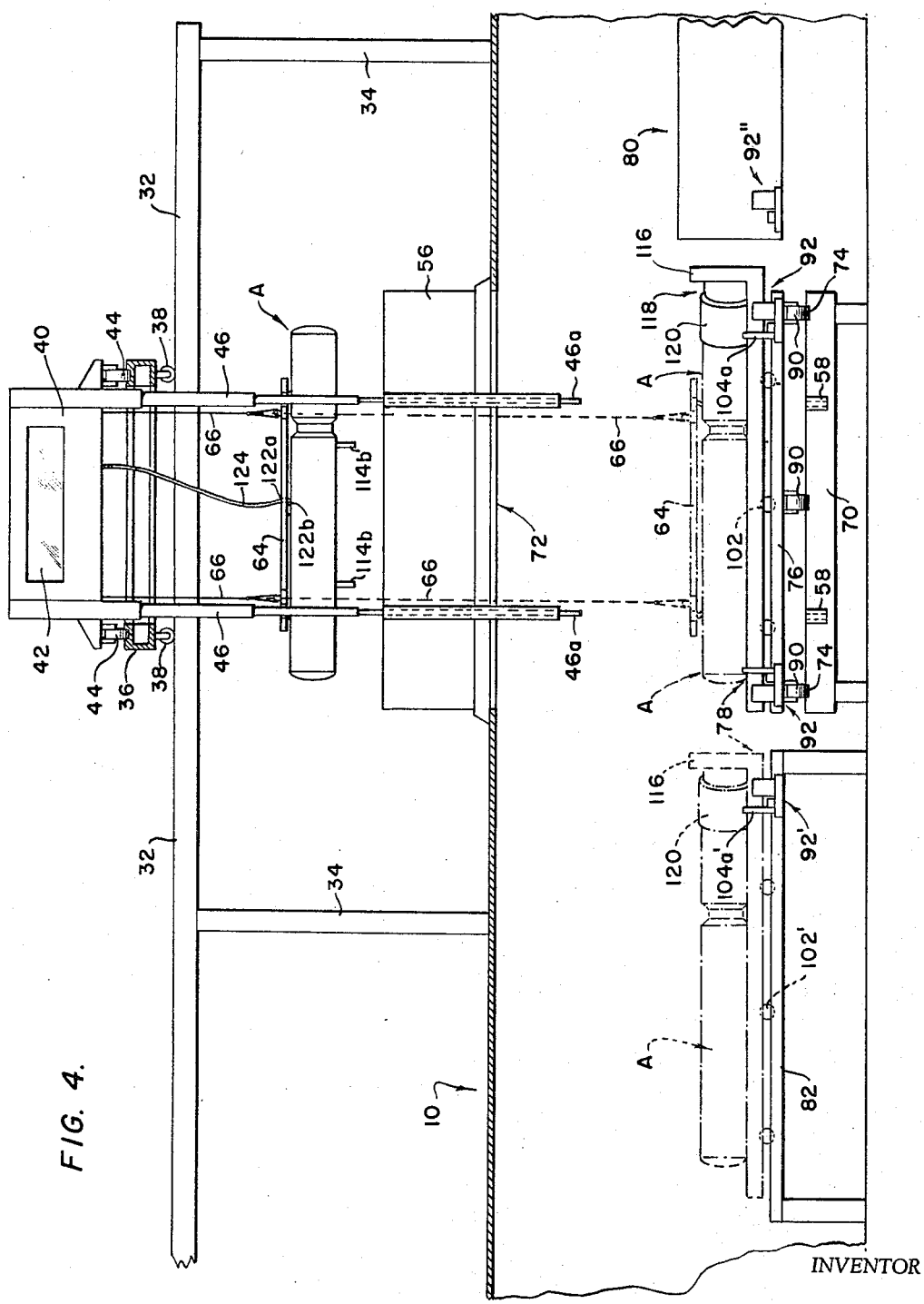
FIG. 4 is a side elevational view, with parts in longitudinal section and showing several positions of a nuclear engine and the handling mechanisms during movement of the engine into and/or out of the hold.

Referring now to FIGS. 3 and 4, a shielded rectangular cab 40, having windows 42 on each side thereof, is mounted for movement lengthwise of the bridge and transversely of the rails 32 by opposite pairs of rollers 44, one or more of which rollers is connected to an electric motor for propelling the cab. The cab is equipped with four telescopic guides 46, one at each corner, as shown in FIG. 3, which guides are power operated by suitable means, not shown, so as to pass through companion guide tubes 48 mounted on a pair of hatches 56 and into sockets 58 on an elevator 70 within the hold of the ship as shown in FIG. 4, and as described hereinafter. The lower ends, 46a, of the telescopic guides are adapted also to fit within four companion sockets 62 mounted on the top surface of the wings of the seaplane at the sides of each of the engines (FIGS. 1 and 2).

A hoist platform 64 is guided at its four corners 64a by the telescopic guides 46, and the platform is raised and lowered by a pair of cables 66 which cables are a part of an automatic hoisting mechanism, not shown, located within the cab 40. Mounted on the under surface of the hoist platform is a plurality of remote, electrically controlled coupling mechanisms 68a, which coupling mechanisms interlock with companion coupling mechanism 68b mounted on the nuclear engines (FIG. 1), which engines are indicated at A and A'.

Referring now to FIG. 4, an automatic elevator 70 is mounted for vertical movement within the hold of the ship immediately beneath the hatchway 72. The elevator extends transversely of the ship beneath the hatchway and is provided with a plurality of rails 74 upon which is movably mounted a dolly 76, referred to in detail hereinafter, and mounted on the dolly for movement therewith and relative thereto is an engine-receiving crade 78, also to be referred to in detail hereinafter. Mounted forward of the elevator 70, as viewed, in FIG. 4, is a plurality of engine-receiving and storing containers 80, only one of which is shown, and located aft of the elevator is a work bench 82 to receive the cradle and attached nuclear engine. The work bench is located within a shielded "hot shop" within the hold of the vessel.

The dolly 76, FIG. 5 is a rectangular structure made up of two channel members 84, connected by cross members 86. The dolly is mounted on the rails 74 of the elevator by a plurality of rollers 90 (FIG. 4), certain of which rollers are power driven by suitable remote-controlled electrical motors, not shown. Referring still to FIG. 5, the dolly is equipped with a pair of worm-drive mechanisms 92, one forward and one aft, each of which mechanisms includes a remote controlled electric motor 94 connected to a gear box 96, which gear box is connected to a pinion gear 98. The pinion gears mesh with a rack 100 in the under surface of the cradle (FIG. 6). A plurality of rollers 102, movably mount the cradle on the dolly and four remotely-controlled electrically-operated clamp mechanisms 104a, only two of which are shown in FIG. 5, engage companion clamp mechanisms 104b on the cradle for releasably securing the cradle to the dolly.

Referring now to FIG. 6, the engine-receiving cradle 78, which is of substantially the same size as the dolly, is made up of a pair of channel members 106, connected by cross-members 108. As shown in FIG. 6, the channel members face downward and are each formed with racks 100 in an upper surface and with a guide channel 112 on the lower portion, which guide channels fit over the rollers 102, of the dolly (FIG. 5). The racks 100 and the guide channels 112 extend throughout the length of the channel members 106. Each of the channel members 106 of the cradle is formed with a pair of sockets 114a in the top surface thereof, which sockets receive locking mechanisms 114b, schematically indicated on the under sides of the nuclear engine A, FIG. 4. The locking mechanisms on the nuclear engine may be the same mechanism by which the engine is mounted and locked on the seaplane.

Referring still to FIG. 6, the cradle is formed with an upstanding end wall 116 upon which is mounted a pair of remotely-controlled electrically-driven fans 118. Each of the fans is provided with a telescopic casing 120 that fits over a companion end of the nuclear engine (FIG. 4), whereby the fans force cooling air through the engine while it is on the cradle. So as to cool the nuclear engine during its movement from the seaplane to the cradle, the hoist platform 64 is equipped with an air connection 122a projecting from a lower surface thereof (FIG. 4), which connection fits into a companion connector 122b (FIG. 1) on the nuclear engine, and which connection 122a is connected by a hose 124 (FIG. 4) to an air compressor located within the cab 40 of the traveling crane.

In operation, assuming that the plane is docked in and made fast to the docking cradle 16 on the deck of the tender ship as shown in FIGS. 1 and 2. The traveling crane is moved from the position of FIG. 1 to that of FIG. 2 so that the cab 40 is immediately over the nuclear engine A of the plane. The telescopic guides 46 are automatically lowered until the lower ends thereof interlock with the sockets 62 on the plane, whereby the crane is temporarily made fast to the plane. The guided hoist platform 64 is now automatically lowered so that the couplings 68a on the platform (FIG. 3) automatically engage the companion couplings 68b (FIG. 1) on the nuclear engine, thereby locking the platform to the engine. During this locking maneuver, the air hose connection 122a on the bottom of the platform is automatically connected to the companion connection 122b on the engine and cooling air is forced through the engine from the air compressor in the cap of the crane. This automatic locking of the platform and air connection to the engine actuates an interlock indicator, not shown, between the seaplane and the nuclear engine, so that now the plane's pilot within the shielded cabin of the plane releases the locking mechanism by which the engine is locked to the plane. The engine is now ready to be hoisted from the plane.

The platform and attached engine is now automatically raised up under the cab by the winch within the cab, and the telescopic guides are elevated and released from the sockets on the plane. The cab, with the attached platform and engine, is now moved on the bridge 36 transversely of the ship and then the bridge is moved on the elevated rails 32 longitudinally of the ship until the cab is immediately above the hatch 56. The hatch is now automatically opened so that the guide tubes 48 thereon (FIG. 3) are in line with the telescopic guides 46 on the cab. Simultaneously with the opening of the hatch, the elevator 70 within the hold, with the dolly and cradle positioned thereon, is automatically raised a predetermined distance so that the cradle is positioned to receive the engine after which the telescopic guides 46 on the platform are automatically lowered until the lower ends thereof engage and interlock with the sockets 58 on the elevator (FIG. 4). The cap is thus made fast to the elevator.

The winch is now automatically operated so that the platform with the engine attached thereto is lowered through the hatchway and into the hold. The lowering proceeds until the locking mechanisms 114b on the engine connect and interlock with the companion mechanism 114a on the cradle. The engine is thus locked to the cradle. Simultaneously with the locking of the engine to the cradle, the telescopic casings 120 of the fans 118 are automatically fitted over the forward ends of the engine and the fans are energized, so that now the fans supply cooling air to the engine. The locking mechanisms between the engine and the hoist platform are now automatically released, after which the platform is automatically elevated to its inactive position under the cab, the telescope guides are automatically withdrawn from the sockets in the elevator and from the guide tubes 48 and the hatch is automatically closed.

Depending upon whether the nuclear engine is to be placed in a storage container or onto the worktable within the hot room, the elevator 70 is automatically lowered so that the rack 100 on the cradle is at the same elevation as the similar rack either within the storage container 80 or on the worktable 82. Assuming that the cradle with the engine attached thereto is to be positioned on the worktable 82, the dolly 76 is automatically moved relative to the elevator until the rack on the cradle is lined up with the rack on the table, after which the dolly is locked relative to the elevator and the clamp mechanisms 104a, 104b between the dolly and cradle are automatically released. Immediately following the release of the dolly-cradle locking mechanism, the aft motor 94 (FIG. 5) of the dolly is automatically energized so that through the pinion and rack arrangement, the cradle with the engine secured thereto is moved from the dolly and onto the operating table. So as to complete this movement of the cradle and attached engine onto the operating table, the table is equipped with rollers 102′ and with an automatically operated pinion mechanism 92′ generally similar to that of the dolly; the arrangement is such that the table pinion automatically takes up where the dolly pinion leaves off. Also the table pinion is used to return the cradle and attached engine to the dolly. Movement of the cradle and attached engine into a storage container is substantially the same as that for putting them on the operating table, except that the forward motor and pinion mechanism of the dolly is used for movement of the cradle and attached engine into the storage container. The storage container also is provided with rollers not shown and with an automatically operated pinion mechanism 92″ that takes up where the dolly pinion mechanism leaves off. In returning an engine from a worktable and/or a storage container to the seaplane the above steps are reversed. As used herein, worktable and/or storage container is used to designate any receptacle capable of receiving the nuclear engine.

The specific embodiment of the invention has been illustrated and described herein in connection with the removal of nuclear engines mounted on top of the wings of a seaplane. However, within the purview of the invention, the specific embodiment may be modified, for example, so as to adopt it for removal of engines from beneath the wings, from within the fuselage and/or for removing nuclear engines from land planes as well as seaplanes. It is therefore to be understood, that within the scope of the appended claims, the invention may be practiced otherwise than as specifically described.

What is claimed is:

1. In a handling system for seaplane engines, a tender ship having a top deck, a hold, and a hatchway formed in the deck for communication between the deck and hold means for docking a seaplane on the deck, and means for removing an engine from the seaplane and depositing such engine in the hold, said last named means comprising a traveling bridge crane having centering means thereon, elevated guide rails for movably supporting the crane on the deck above the seaplane for movement between the seaplane and the hatchway, centering means on the hatchway cooperating with the means on the crane for centering the crane above the hatchway, means on the seaplane cooperating with the said means on the crane for centering the crane above the seaplane, and a hoist on the crane for raising an engine from the seaplane, transporting said engine upon movement of the crane to a position above the hatchway and for lowering said engine through the hatchway into the hold.

2. A handling system as set forth in claim 1 wherein the centering means on the hatchway includes a plurality of vertical guide tubes, wherein the said cooperating means on the crane includes a plurality of vertical telescopic guides formed for movement into and out of the said guide tubes, and wherein the centering means on the seaplane includes a plualiy of sockets formed to receive lower ends of the telescopic guides.

3. A handling system as set forth in claim 1 wherein the hoist includes a platform having a set of clamps on a lower surface thereof, and wherein the engine has a set of companion clamps on an exterior surface thereof, which sets of clamps lock the engine to the platform when the hoist is lowered into position to lift the engine from the seaplane.

4. A handling system as set forth in claim 1 which additionally includes an elevator positioned in the hold beneath the hatchway and extending transversely of the hold, and means on the elevator for receiving the engine lowered into the hold by the hoist.

5. A handling system as set forth in claim 4 wherein the means for receiving the engine includes a dolly mounted on the elevator for movement relative thereto transversely of the hold and an engine-receiving cradle mounted on the dolly and releasably clamped thereto for movement relative thereto longitudinally of the hold.

6. A handling system as set forth in claim 5 wherein the dolly and the engine-receiving crade each have cooperating means thereon for locking the cradle to the dolly.

7. A handling system as set forth in claim 5 wherein the engine and the engine-receiving cradle each have cooperating means thereon for locking the engine to the cradle.

8. A handling system as set forth in claim 5 wherein the dolly and the engine-receiving cradle each have cooperating power means thereon for moving the cradle relative to the dolly.

9. A handling system as set forth in claim 5 which additionally includes a receptacle mounted in the hold adjacent the elevator and cooperative power means on the receptacle for moving the cradle with the engine locked thereto from the dolly to such receptacle.

10. A handling system as set forth in claim 9 wherein the cooperative power means on the receptacle and on the cradle for moving the cradle from the dolly to the receptacle includes a gear rack mounted on a lower surface of the cradle and a pinion gear mounted on the receptacle in position to mesh with the rack.

11. A system for handling radioactive seaplane engines said system cvomprising a submersible tender with a hold and a top deck having a hatchway interconnecting said hold and said top deck, means for docking a seaplane on said top deck, means including a traveling bridge crane disposed above said deck for removing an engine from the seaplane and depositing the engine in the hold of the tender through the hatchway, and engine centering means on the hatchway disposed in cooperative relation with the crane.

12. A system for handling radioactive seaplane engines and comprising a submersible tender with a top deck, means for docking a seaplane on said deck including a traveling bridge crane, means for removing a nuclear engine from the seaplane, and centering means on the hatchway cooperating with means on the crane for centering the crane above the seaplane, said centering means including cooperative telescopic guides.

13. In a handling system for seaplane engines, a tender ship having a top deck, a hold, and a hatchway formed in the deck for communication between the deck and hold, means for docking a seaplane on the deck, and means for removing an engine from the seaplane and depositing such engine in the hold, said last named means comprising a traveling bridge crane having centering means thereon, elevated guide rails for movably supporting the crane on the deck above the seaplane for movement between the seaplane and the hatchway, centering means on the hatchway cooperating with the means on the crane for centering the crane above the hatchway, means on the seaplane cooperating with the said means on the crane for centering the crane above the seaplane, and a hoist on the crane for raising an engine from the seaplane, transporting said engine upon movement of the crane to a position above the hatchway and for lowering said engine through the hatchway into the hold, an elevator positioned in the hold beneath the hatchway and extending transversely of the hold, and means on the elevator for receiving the engine lowered into the hold by the hoist, said engine receiving means including a dolly mounted on the elevator for movement relative thereto transversely of the hold and an engine-receiving cradle mounted on the dolly and releasably clamped thereto for movement relative thereto longitudinally of the hold, said dolly and said engine-receiving cradle each having cooperating power means thereon for moving the cradle relative to the dolly, said power means for moving the cradle relative to the dolly including a gear rack on a lower surface of the cradle, a pinion gear mounted on an upper portion of the dolly in position to mesh with the rack and a remotely controlled electric motor mounted on the dolly and connected to the pinion for rotating such pinion.

14. A handling system as set forth in claim 13 which additionally includes a receptacle mounted in the hold adjacent the elevator, and power means on this receptacle for moving the cradle with the engine attached thereto from the dolly onto the receptacle, said power means including a pinion gear mounted on the receptacle in position to mesh with the rack on the cradle, the construction and arrangement of the two power means being such that the power means on the dolly moves the cradle part way from the dolly onto the receptacle, whereas the power means on the receptacle completes such movement.

References Cited
UNITED STATES PATENTS

| | | |
|---|---|---|
| 2,107,210 | 2/1938 | Palm. |
| 2,181,881 | 12/1939 | Ferris _____ 114—43.5 X |
| 2,319,855 | 5/1943 | Forsberg _____ 114—43.5 |

MILTON BUCHLER, *Primary Examiner.*

BENJAMIN A. BORCHELT, *Examiner.*